US008805804B2

(12) United States Patent
Harrop

(10) Patent No.: US 8,805,804 B2
(45) Date of Patent: Aug. 12, 2014

(54) CONFIGURING AN APPLICATION PROGRAM IN A COMPUTER SYSTEM

(75) Inventor: Rob Harrop, Southampton (GB)

(73) Assignee: Pivotal Software, Inc., Palo Alto, CA (US)

( * ) Notice: Subject to any disclaimer, the term of this patent is extended or adjusted under 35 U.S.C. 154(b) by 1150 days.

(21) Appl. No.: 12/609,297

(22) Filed: Oct. 30, 2009

(65) Prior Publication Data

US 2010/0138825 A1    Jun. 3, 2010

Related U.S. Application Data

(60) Provisional application No. 61/164,037, filed on Mar. 27, 2009.

(30) Foreign Application Priority Data

Nov. 28, 2008  (GB) .................................. 0821773.9

(51) Int. Cl.
*G06F 17/00* (2006.01)
*G06F 7/00* (2006.01)

(52) U.S. Cl.
USPC .......................................... 707/694; 717/174

(58) Field of Classification Search
USPC ........................................................ 717/174
See application file for complete search history.

(56) References Cited

U.S. PATENT DOCUMENTS

| 5,038,294 | A * | 8/1991 | Arakawa et al. ............... 716/126 |
| 8,214,401 | B2 * | 7/2012 | Rao et al. ....................... 707/794 |
| 2002/0100017 | A1 * | 7/2002 | Grier et al. ..................... 717/120 |
| 2006/0020937 | A1 | 1/2006 | Schaefer |
| 2006/0075399 | A1 * | 4/2006 | Loh et al. ....................... 717/174 |
| 2006/0080413 | A1 * | 4/2006 | Oprea et al. ................... 709/220 |
| 2009/0144701 | A1 * | 6/2009 | Faus .............................. 717/121 |

FOREIGN PATENT DOCUMENTS

WO      2007076946 A1    7/2007

OTHER PUBLICATIONS

United Kingdom "Combined Search and Examination Report under Sections 17 & 18(3)" dated Feb. 24, 2009.

* cited by examiner

*Primary Examiner* — Pavan Mamillapalli
(74) *Attorney, Agent, or Firm* — Fish & Richardson P.C.

(57) ABSTRACT

A computer system which configures an application program to execute with one or more resources is disclosed. The computer system includes a configuration unit to configure the application program for deployment into a runtime execution environment. The application program is divided into a plurality of bundles and the configuration unit examines the bundles individually to determine a bundle environment for each bundle based on dependencies of that bundle on the one or more resources. The configuration unit selects one or more conventions, which provide templates of configuration for a relevant resource, according to the determined bundle environment, and the configuration unit automatically generates a system configuration from the selected conventions and adds the generated system configuration to the application program, whereby the dependencies of the application program upon the resources are configured based on at least the automatically generated system configuration.

17 Claims, 6 Drawing Sheets

CONFIGURING AN APPLICATION PROGRAM IN A COMPUTER SYSTEM

CROSS REFERENCE TO RELATED APPLICATION(S)

The application claims the benefit of U.S. Provisional Application No. 61/164,037 filed on Mar. 27, 2009. This application also claims the benefit of UK Patent Application No. 0821773.9 filed on Nov. 28, 2008.

BACKGROUND

1. Technical Field

The present invention relates generally to the field of computers and computer systems. More particularly, the present invention relates to a computer system and to a method for configuring an application program in a computer system.

2. Description of Related Art

Modern computing systems have become highly sophisticated and complex machines, which are relied upon to perform a huge range of tasks in all our everyday lives. These computer systems comprise a very large number of individual components and sub-systems that must all work together correctly. Thus, creating programs to execute on these systems is a difficult and challenging task. In particular, the application programs that run on these modern computing systems have become increasingly complex and are increasingly difficult to develop. This leads to very lengthy development and deployment cycles and/or leads to errors (e.g. crashes) when the computer systems execute the application programs under a live load and serving real users. It is therefore desired to improve the stability and reliability of such computer systems. Also, it is desired to reduce the workload which is involved in developing new applications to be used by such computer systems.

An application program typically includes a configuration file, which is read by the computer system at the start of execution of the application program. In general terms, the configuration file defines how this application will interact with the various resources provided by the computer system, and defines how the computer system needs to be adapted in order to support the program. That is, the configuration file contains configuration data (often simply called "configuration") which is used to configure the application to execute on a runtime execution environment provided by this particular computer system. Traditionally, the configuration file is written in a text-based format such as ASCII. More recently, the configuration is written in a markup language such as XML and is usually structured to follow a predetermined schema. Also, the configuration is often distributed among many different parts of the application and may be supplied in several different formats even within the same application. That is, configuration is often diverse and distributed rather than being collected together in one separate configuration file. Also, the complex nature of modern computer systems means that a large volume of configuration is often required.

There have already been some attempts to reduce the need for configuration files. One example is Ruby on Rails, which is a high level object oriented programming language with a web-application framework tailored for developing database-backed web applications. Ruby on Rails forces applications to follow predetermined conventions, such as file naming conventions, that in turn reduce the need for file names to be declared in separate configuration files. Whilst acknowledged as being good practice, such naming conventions have limited applicability and are appropriate mostly in closed environments where the application is produced by a single source or vendor and has minimal dependencies on resources that are supplied by third parties. By contrast, many modern application programs are developed for use in open-ended environments that bring together resources from many different sources and vendors. Thus, configuration is still used by most modern application programs.

The exemplary embodiments have been provided with a view to addressing at least some of the difficulties that are encountered in current computer systems, whether those difficulties have been specifically mentioned above or will otherwise be appreciated by the person of ordinary skill in the art from the discussion herein. At least in some of the following exemplary embodiments, it is desired to provide an improved mechanism for configuring an application program in a computer system.

SUMMARY OF THE INVENTION

According to the present invention there is provided a computer system, a method and a computer-readable storage medium as set forth in the appended claims. Other, optional, features of the invention will be apparent from the dependent claims, and the description which follows.

The example embodiments of the present invention discussed herein concern the automatic configuration of an application program in a computer system. In particular, the exemplary embodiments of the present invention concern a mechanism to configure an application program in relation to libraries and other resources of the computer system, so that the computer system will execute the application program correctly in combination with the library resources.

There now follows a summary of various aspects and advantages according to embodiments of the invention. This summary is provided as an introduction to assist those skilled in the art to more rapidly assimilate the detailed discussion herein and does not and is not intended in any way to limit the scope of the claims that are appended hereto.

Generally, a computer system is provided which configures an application program to execute with one or more resources such as libraries. The computer system suitably comprises a configuration unit that is arranged to configure the application program ready for deployment into a runtime execution environment, wherein the application program is divided into a plurality of bundles. In use, the configuration unit examines the bundles individually to determine a bundle environment for each bundle based on the dependencies of that bundle on the one or more library resources, the configuration unit selects one or more conventions, which provide fragments or templates of configuration for a relevant library resource, according to the determined bundle environment, and the configuration unit automatically generates a system configuration from the selected conventions and adds the generated system configuration to the application program, whereby the dependencies of the application program upon the relevant library resources are then configured based on at least the automatically generated system configuration.

In one exemplary aspect there is provided a computer system comprising a runtime execution environment arranged to execute an application program with respect to a plurality of resources, wherein the application comprises a plurality of bundles and each of the bundles comprises a metadata which declares one or more dependencies of the application onto the plurality of resources, one or more classes which execute using the plurality of resources and/or a user configuration to configure the application program with respect to the plurality of resources; a configuration unit arranged to configure the application program ready for deployment into the runtime execution environment, wherein the configuration unit is arranged to determine a bundle environment for each of the bundles based on the metadata, the classes and/or the user configuration of the respective bundle, select a subset of a plurality of conventions according to the bundle environment of the respective bundle, generate a system configuration according to the subset of the plurality of conventions, and add the system configuration to the respective bundle; and a deployment unit arranged to deploy the application program into the runtime environment, including satisfying the dependencies of the application program with respect to the plurality of resources, wherein the deployment unit is arranged to deploy the application program into the runtime environment according to both the user configuration and the system configuration.

In one exemplary aspect, the conventions are arranged into a plurality of convention sets and each of the convention sets is associated with a corresponding resource of the plurality of resources, and wherein the configuration unit selects one or more of the convention sets according to the resources upon which the bundle depends.

In one exemplary aspect, the convention sets are associated with differing versions of the resources.

In one exemplary aspect, the convention sets are associated with a plurality of triggers which relate to the dependencies of the application program on the resources, and the configuration unit determines the bundle environment according to the triggers which are satisfied for the respective bundle.

In one exemplary aspect, the triggers relate to explicitly declared dependencies upon the resources and/or to inferred dependencies upon the resources according to the metadata, the classes and/or the user configuration of the bundle.

In one exemplary aspect, the resources comprise a plurality of third-party libraries.

In one exemplary aspect, the resources are arranged in a plurality of bundles, and the bundles of the resources have a format compatible with the bundles of the application program.

In one exemplary aspect, the computer system further comprises a configuration control unit arranged to selectively deactivate certain of the conventions from use by the configuration unit. For example, the configuration control unit selectively deactivates the conventions according to conflicts detected between the user configuration and the generated system configuration. In this case, the configuration unit automatically deactivates the conventions that gave rise to the conflict, such as by deactivating one of the convention sets. In particular, the configuration unit deactivates a convention set of a resource where the user configuration already includes configuration for that resource. In another example, the configuration control unit selectively deactivates the conventions according to user commands received via a user interface.

In one exemplary aspect, the computer system further comprises a configuration recording unit arranged to record the selected conventions and the corresponding system configuration for each of the bundles into a log file and to report the log file through a user interface. Here, the configuration recording unit suitably records the activated triggers, the corresponding convention sets, and the generated system configuration.

In one exemplary aspect the computer system further comprises a third party interface unit arranged to receive additional conventions into the configuration unit in relation to additional resources added to the plurality of resources. For example, in use, the third party interface couples the computer system to a separate developer system across a network. The developer system supplies the new library resource for the bundle repository, and supplies the corresponding convention set to the configuration unit via the third party interface unit.

Generally, a method is provided of configuring an application program in a computer system. The method suitably comprises, inter alia, the steps of: examining each of a plurality of bundles in the application program in turn, wherein each of the bundles comprises metadata which declares one or more dependencies of the application onto a plurality of resources, one or more classes which execute using the plurality of resources and/or a user configuration to configure the application program with respect to the plurality of resources; determining a bundle environment for each of the bundles based on the metadata, the classes and/or the user configuration of the respective bundle; selecting one or more conventions according to the bundle environment of the respective bundle, wherein each of the conventions comprises a template of configuration with respect to a corresponding resource of the plurality of resources; automatically generating a system configuration according to the templates of configuration in the selected conventions; and adding the system configuration to the metadata of the respective bundle.

In one exemplary aspect, a method is provided for deploying an application program into a computer system and/or of executing an application program on a computer system, wherein the method includes the step of configuring the application program as discussed herein. Here, the method may comprise the steps of: installing the application program onto the computer system as a plurality of bundles; resolving the bundles to satisfy a set of dependencies of the bundles with respect to a plurality of resources of the computer system; configuring the application program with respect to the plurality of resources according to both the user configuration and the system configuration in each of the plurality of bundles; starting the bundles in a runtime execution environment of the computer system; and executing the application program in the runtime execution environment of the computer system in combination with the plurality of resources.

Generally, a computer-readable storage medium is provided having recorded thereon instructions which, when implemented by a computer system, cause the computer system to be arranged as set forth herein and/or which cause the computer system to perform the method as set forth herein. In one aspect, the computer-readable storage medium comprises a configuration unit which, when executed, configures an application program for deployment into a runtime execution environment of a computer system, wherein the application program is divided into a plurality of bundles and the configuration unit examines the bundles individually to determine a bundle environment for each bundle based on the dependencies of that bundle on the one or more resources, the configuration unit selects one or more conventions, which provide templates of configuration for a relevant resource, according to the determined bundle environment, and the configuration unit automatically generates a system configuration from the selected conventions and adds the generated system configuration to the application program, whereby the dependencies of the application program upon the relevant resources are configured at least based on the automatically generated system configuration.

At least some embodiments of the invention may be constructed, partially or wholly, using dedicated special-purpose hardware. Terms such as 'component', 'module' or 'unit' used herein may include, but are not limited to, a hardware device, such as a Field Programmable Gate Array (FPGA) or Application Specific Integrated Circuit (ASIC), which performs certain tasks. Alternatively, elements of the invention may be configured to reside on an addressable storage medium and be configured to execute on one or more processors. Thus, functional elements of the invention may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Further, although the exemplary embodiments have been described with reference to the components, modules and units discussed below, such functional elements may be combined into fewer elements or separated into additional elements.

BRIEF DESCRIPTION OF THE DRAWINGS

For a better understanding of the invention, and to show how exemplary embodiments may be carried into effect, reference will now be made to the accompanying drawings in which.

DETAILED DESCRIPTION

The exemplary embodiments of the present invention will be discussed in detail in relation to Java, Spring, OSGi and so on. However, the teachings, principles and techniques of the present invention are also applicable in other exemplary embodiments. For example, embodiments of the present invention are also applicable to other virtual machine environments and other middleware platforms, which will also benefit from the teachings herein.

Figure 1:
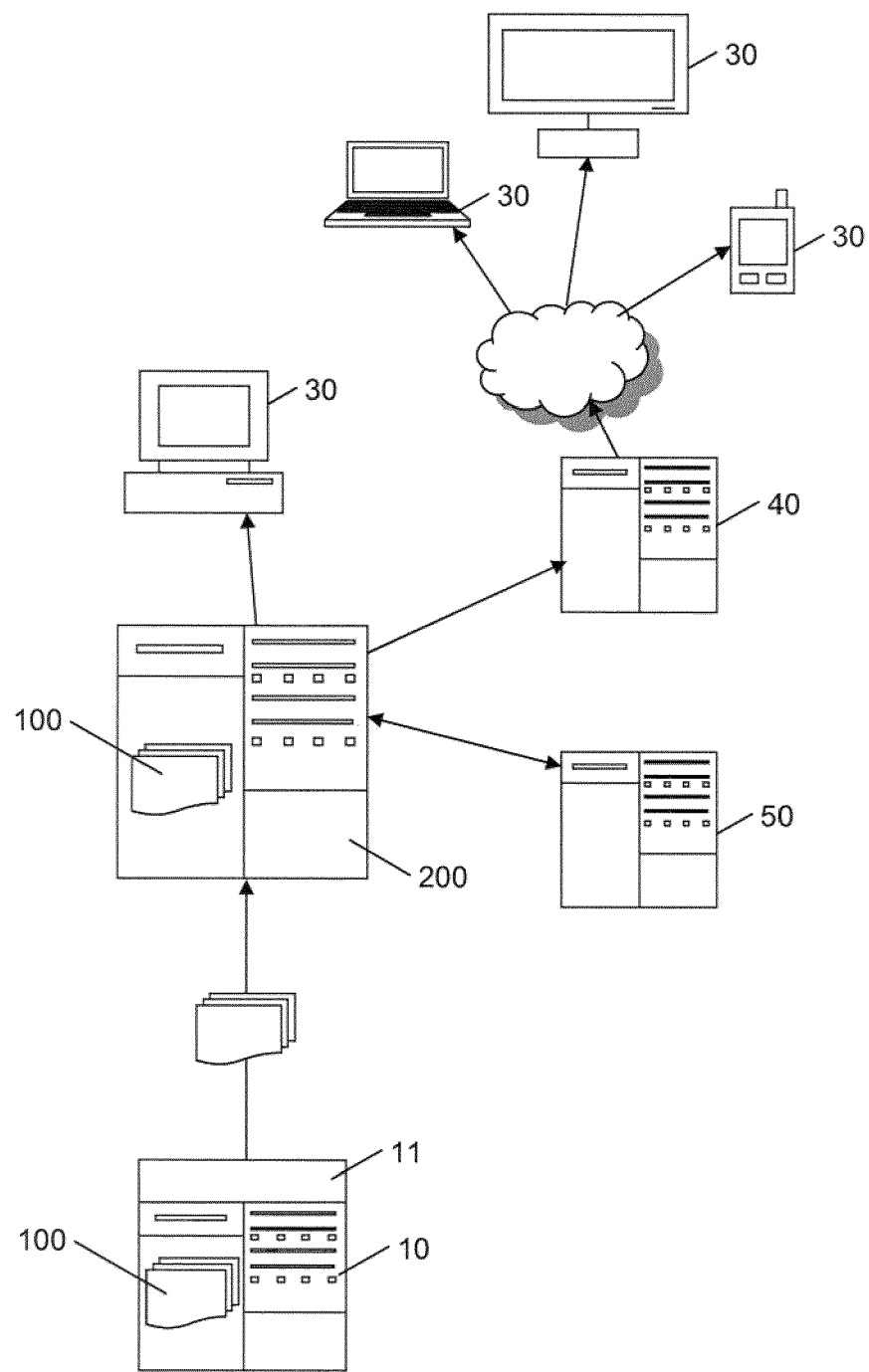
FIG. 1 is a schematic overview of an example computer network in which the exemplary embodiments may be used.

FIG. 1 is a schematic overview of an example computer network in which the exemplary embodiments discussed herein are applied. An application program 100 is developed on a development system 10 and is tested by a variety of testing tools 11. The finished application 100 is then deployed onto one or more host computer systems 200, using a suitable deployment mechanism. The application 100 runs (executes) on the host computer system 200 and, in this example, serves one or more individual end-user client devices 30 either over a local network or via intermediaries such as a web server 40. When running the application 100, the host computer system 200 will often communicate with various other back-end computers such as a set of database servers 50. FIG. 1 is only an illustrative example and many other specific network configurations will be apparent to those skilled in the art.

The application program 100 is typically developed using object-oriented programming languages, such as the popular Java language developed by Sun Microsystems. Java relies upon a virtual machine which converts universal Java bytecode into binary instructions in the instruction set of the host computer system 200. More recently, Java 2 Standard Edition (J2SE) and Java 2 Enterprise Edition (JEE or J2EE) have been developed to support a very broad range of applications from the smallest portable applets through to large-scale multilayer server applications such as complex controls for processes, manufacturing, production, logistics, and other industrial and commercial applications.

Figure 2:
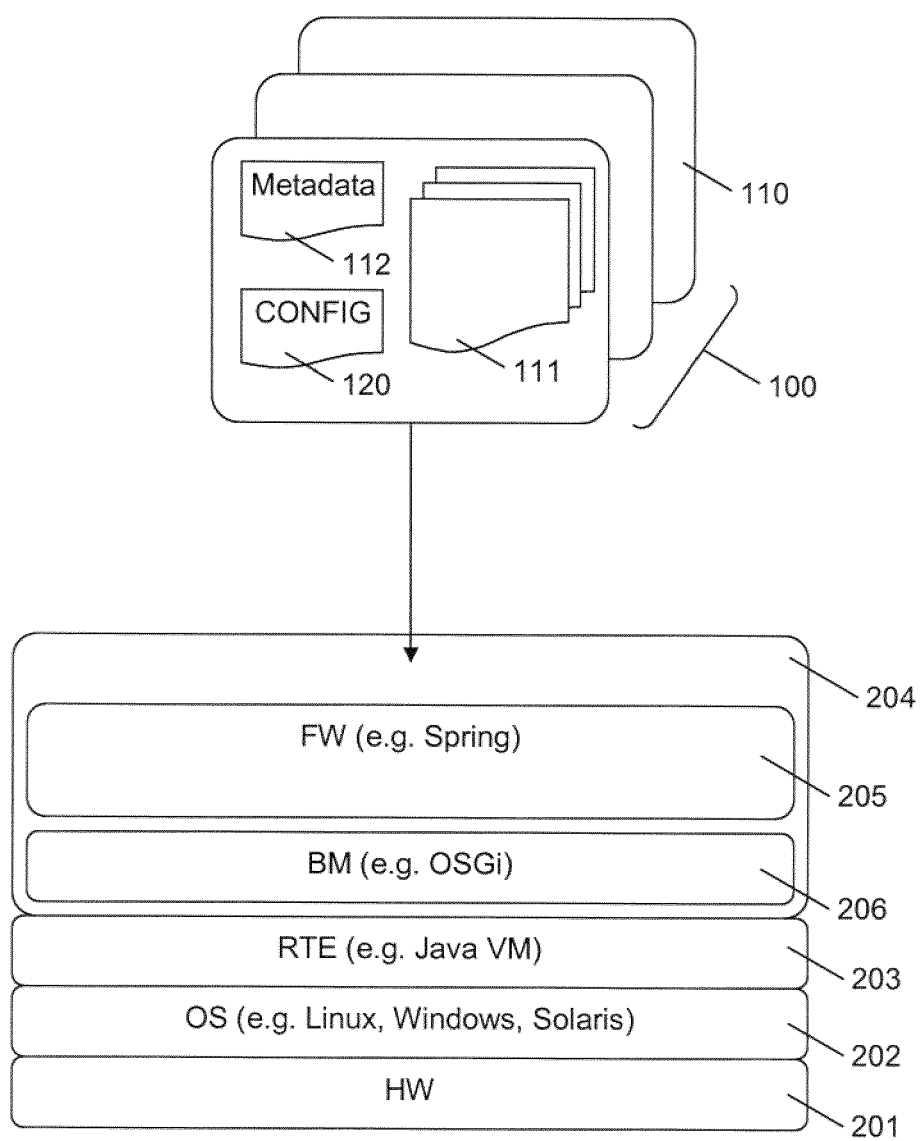
FIG. 2 is a schematic overview of a computer system according to an exemplary embodiment.

FIG. 2 is a schematic overview of a computer system 200 according to an exemplary embodiment of the present invention. In this example, the host computer system 200 includes physical hardware (HW) 201 such as memory, processors, I/O interfaces, backbone, power supply and so on as are found in, for example, a typical server computer; an operating system (OS) 202 such as Windows, Linux or Solaris; and a runtime environment (RTE) 203 such as Microsoft .NET or Java (e.g. Hotspot or Java 1.5). The runtime environment 203 supports a multitude of components, modules and units that coordinate to perform the actions and operations that are required of the computer system 200 to support execution of the application program 100.

In the exemplary embodiments, the host computer 200 also includes a middleware layer (MW) 204. This middleware layer 204 serves as an intermediary between the application program 100 and the underlying layers 201-203 with their various different network technologies, machine architectures, operating systems and programming languages. In the illustrated example, the middleware layer 204 includes a framework layer 205, such as a Spring framework layer. Increasingly, applications are developed with the assistance of middleware such as the Spring framework. The application 100 is then deployed onto the host computer system 200 with the corresponding framework layer 205, which supports the deployment and execution of the application 100 on that computer system 200.

The application 100 is conveniently formatted as a plurality of bundles 110. In general terms, a bundle is a packet, module or other subdivision comprising one or more portions of computer code (classes) which form part of an application program. Typically, the code in one bundle 110 will rely upon code in one or more other bundles 110 for proper execution of the application program 100. Thus, the bundles 110 are semi-independent collections of computer code but which are interdependent upon one another as part of a larger application. In this example, at least some of the bundles 110 comprise one or more classes 111 which are grouped into one or more logically related packages. Conveniently, the Spring framework layer 205 allows the application 100 to be based mostly on Plain Old Java Objects (POJOs).

Typically, the application program 100 is released from the development system 10 (see FIG. 1) with each of the bundles 110 in the form of a compressed ZIP or JAR (Java archive) file ready to be deployed on the host computer system 200. Other examples include WAR (web archive) files and EAR (enterprise archive) files. Here, each bundle 110 includes a metadata unit 112, such as a manifest (e.g. the manifest file META-INF/MANIFEST.MF), that gives metadata about the bundle 110 and/or about the classes 111 contained in that bundle 110.

In the illustrated example, the framework layer 205 includes or is coupled to a bundle management layer (BM) 206 such as an OSGi Module Layer that manages the bundles 110. Here, the bundle management layer 206 assists in managing the installation and update of the bundles 110 in an OSGi environment in a dynamic and scalable fashion.

However, those skilled in the art will appreciate that the illustrated example is merely one of many possibilities and that other specific arrangements will be appropriate in other implementations. For example, another exemplary embodiment is based instead on the Java Enterprise Edition (JEE) environment, which uses bundles ("modules") compliant with JSR 277.

As shown in FIG. 2, the application 100 also comprises a configuration 120. As one example, the configuration 120 is written in the XML markup language and is optionally formatted according to a predetermined schema. In the example embodiment, the framework layer 205 defines beans (e.g. Spring beans) which represent dependencies of the application 100 upon resources that are provided by the runtime environment 203 of the host computer system 200. These Spring beans, the dependencies, and the services needed by the beans are specified by the configuration 120. Also, those skilled in the art will appreciate that the configuration 120 is often divided into a plurality of separate sections and is distributed in various different parts of the application. Thus, in practical embodiments, the configuration 120 may be provided as a collection of separate configuration sections.

The complex nature of modern computer systems means that a large amount of configuration 120 may be required. Also, the configuration 120 may be highly complex. Typically, the configuration 120 is tailored specifically to the requirements of the application 100 and is bespoke for each application. The configuration 120 is often written laboriously by hand or is cut-and-pasted from previous applications and then carefully modified for this new application. Both methods are expensive and time-consuming. As a result, many difficulties arise when initially creating the configuration 120. For example, it takes a lot of time and effort to produce the configuration 120 and this effort is often duplicated many times when creating new applications. Also, it is difficult for a large team of programmers to coordinate their efforts and produce a coherent and accurate configuration 120 that applies correctly and consistently across many different parts of the application 100. Further, it is difficult to later change the configuration 120, such as when the application 100 evolves and is deployed to alternate or improved versions of the runtime environment 203.

Figure 3:
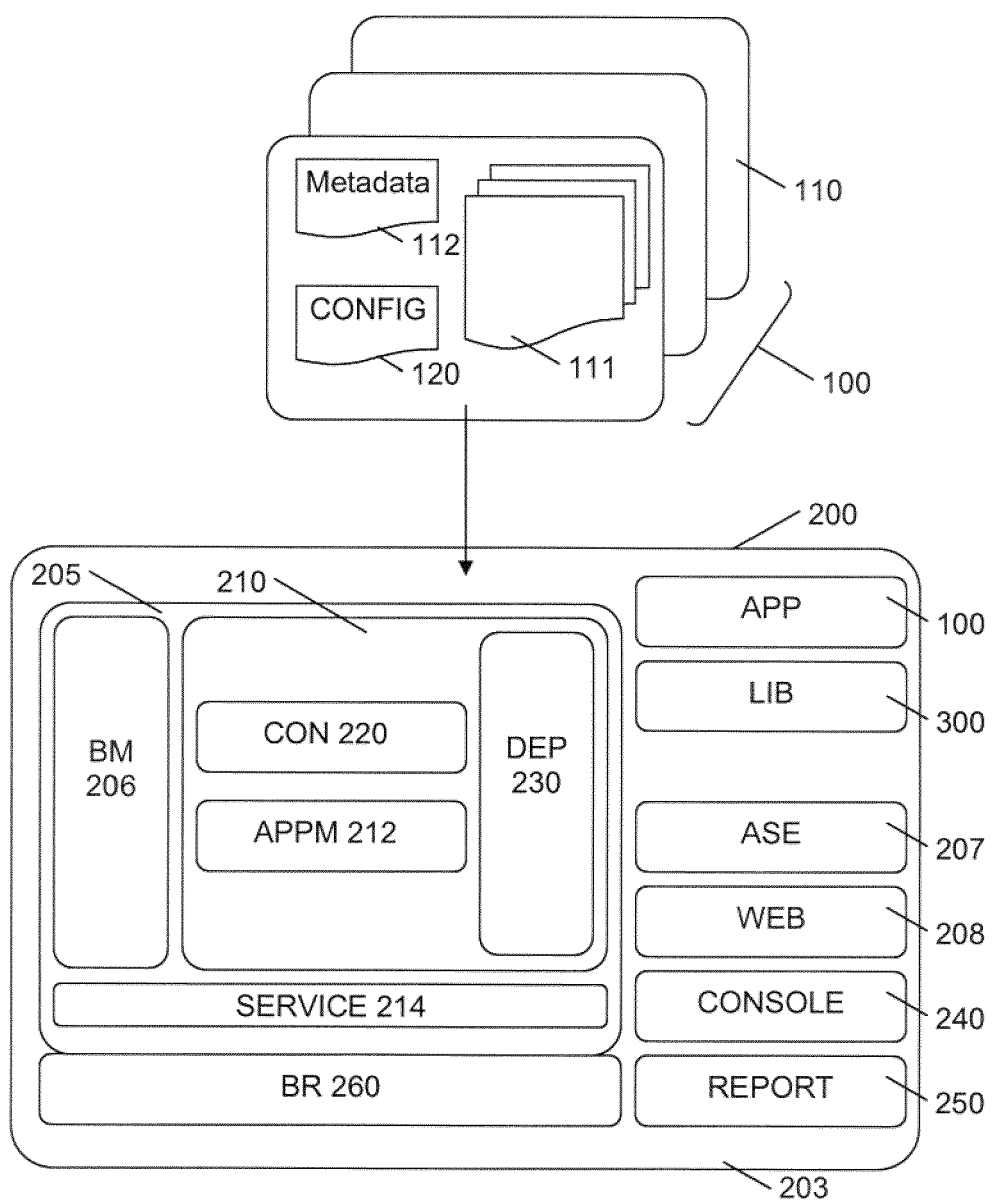
FIG. 3 is a schematic diagram showing various components within the exemplary computer system in more detail.

FIG. 3 is a schematic diagram illustrating components within the runtime execution environment 203 of the computer system 200 in more detail, particularly in relation to an exemplary embodiment of the framework layer 205.

As noted above, the runtime environment 203 includes the exemplary Spring framework layer 205 which in turn includes the OSGi bundle management layer 206. Also, this example includes a front-end application server environment (ASE) 207 such as Tomcat, and a Web support unit 208 which supports the application 100. Other units such as a WAR support unit (not shown) are provided, according to the specific needs of the runtime environment as will be familiar to those skilled in the art.

As shown in FIG. 3, in this example the computer system 200 further includes a framework kernel 210, an application management unit (APPM) 214, and a serviceability unit (SERVICE) 218. The serviceability unit 218 suitably performs a variety of service tasks including Trace, Logging, First Failure Data Capture (FFDC), Asserts and Aspects as will be familiar to those skilled in the art. Further, the framework layer 205 comprises a configuration unit (CON) 220, and a deployment unit (DEP) 230, which will be discussed in detail below.

As also shown in FIG. 3, the exemplary computer system 200 further comprises a management console unit (CONSOLE) 240, a reporting unit (REPORT) 250, a bundle repository (BR) 260, and at least one third-party resource 300 such as a library (LIB), which again will be discussed in detail below.

The bundle repository 260 conveniently comprises several hundred open source enterprise libraries that are commonly required when developing applications using the Spring framework 205. The bundle repository 260 suitably provides these libraries for general use in the form of bundles (i.e. in a form equivalent to the bundles 110 of the application 100). Most conveniently, the libraries are provided as OSGi bundles. The library bundles from the bundle repository 260 are readily brought into the runtime environment 203 when needed as a resource by the application 100. The kernel 210 provisions the library bundles from the bundle repository 260 on demand through the bundle management layer 206. In FIG. 3, the library 300 is an active resource within the runtime environment 203 ready to satisfy a dependency of the application 100. Conveniently, the bundle repository 260 minimises a memory footprint of the framework layer 205 within the runtime environment 203, thus leaving more resources of the computer system 200 available for use by the application 100.

As noted above, the libraries 300 are often provided by third parties and are thus not directly under the control of the provider of the application 100. In this open environment, the configuration 120 enables the application 100 to interact with these third party resources 300. Although the libraries 300 are a prime example of such third party resources, there are other resources upon which the application 100 will depend. For example, the application 100 will often depend upon resources provided within the execution environment 203, such as Java 5 or Java 6.

The configuration unit 220 configures the application 100 ready for deployment by the deployment unit 230. The deployment unit then deploys the configured application into the runtime environment 203 including satisfying the dependencies of the application with the third-party libraries 300. More particularly, the configuration unit 220 is arranged to configure the plurality of bundles 110 into a configured form ready for deployment by the deployment unit 230. The deployment unit 230 then deploys the configured application bundles 110 into the runtime environment 203, including satisfying the dependencies of the bundles 110 with the relevant resources 300.

Figure 4:
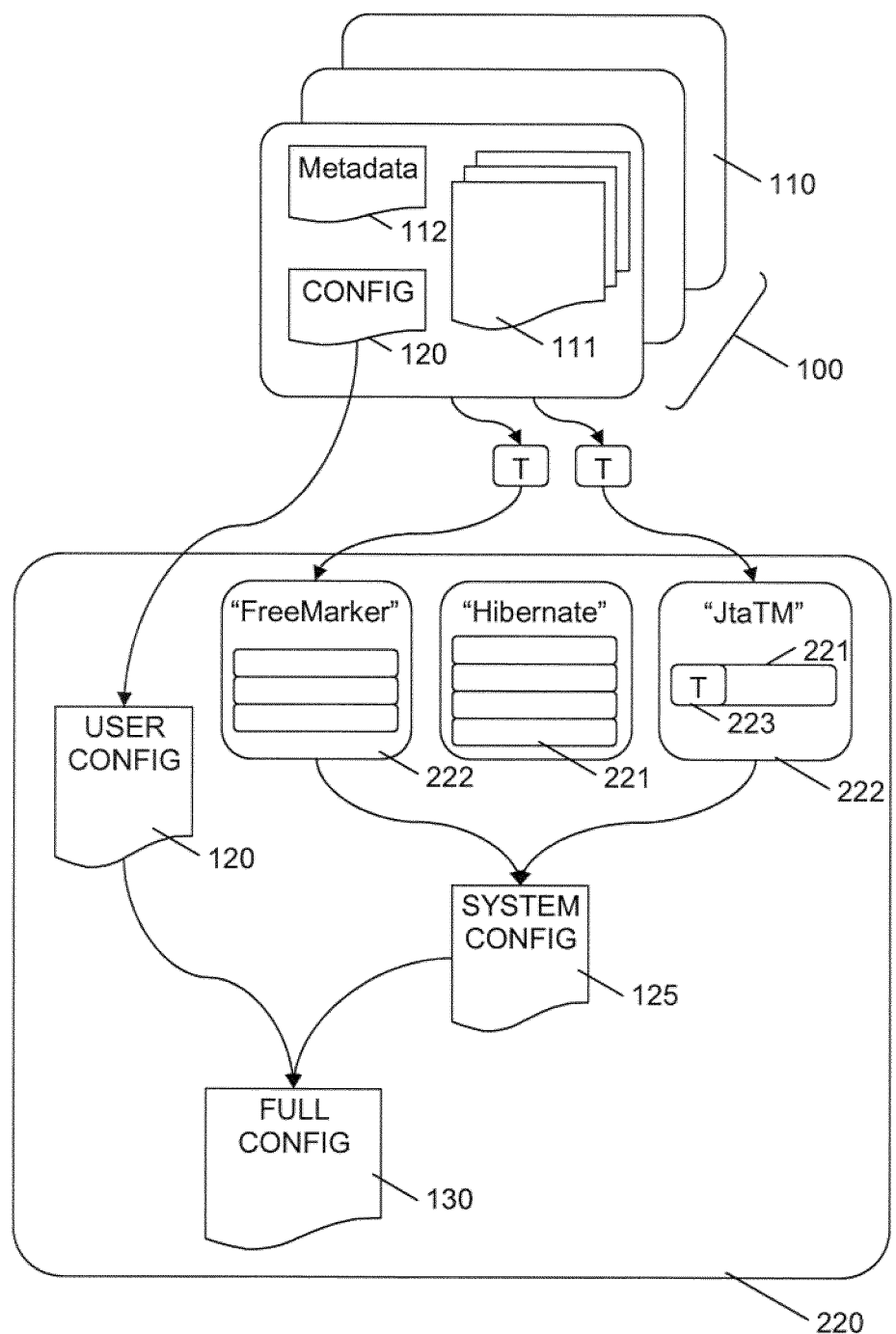
FIG. 4 is a schematic diagram showing the exemplary computer system in more detail in a process of configuring an application.

FIG. 4 is a schematic diagram showing the computer system in more detail. In particular, FIG. 4 illustrates the configuration unit 220 in more detail.

Here, the configuration unit 220 comprises a large plurality of predetermined conventions 221 which are conveniently arranged into convention sets 222. Each of these convention sets 222 is then associated with a respective resource 300 in the computer system 200. For example, as illustrated in FIG. 4, a first convention set 222 is associated with the library resource "FreeMarker". Another convention set 222 is associated with the library resource "Hibernate". A further convention set 222 is associated with "JtaTransactionManager", and so on.

Each of the conventions 221 provides a fragment of configuration. That is, each convention 221 provides a predetermined configuration template. Where the configuration is expressed as textual data, such as XML, then the conventions 221 suitably provide a short section of XML data.

As shown in FIG. 4, each of the conventions 221 is conveniently associated with one or more predetermined triggers 223. These triggers 223 correspond to conditions that are determined by examining the bundles 110. When the bundle 110 matches any of these predetermined triggers 223, the configuration unit 220 then selects the relevant convention sets 222 and generates the system configuration 125 according to the selected set of conventions 221.

As shown in FIG. 4, the configuration unit 220 selects the appropriate configurations 221 from the convention sets 222 and applies these selected configurations 221 to generate a system configuration 125. This system configuration 125 is then added to the user configuration 120 that was supplied with the application 100 to generate a final full configuration 130. The application 100 is then configured based on the full configuration 130—as if the full configuration 130 has originally been received with the application 100. That is, the configuration of the application 100 now proceeds as normal based on the full configuration 130.

Looking now at this example embodiment in more detail, the configuration unit 220 firstly determines a bundle environment for each of the bundles 110. The bundle environment is determined by examining each bundle individually. In practical embodiments, the application 100 may comprises many bundles 110 and many individual classes 111. It is common for applications to involve, for example, some ten thousand individual classes (including libraries). However, one bundle typically contains relatively few classes, such as a few tens of classes. Thus, examining each bundle 110 individually is relatively fast and inexpensive.

For example, the configuration unit 220 firstly examines any explicitly declared dependencies within this bundle 110. Secondly, the configuration unit 220 examines (scans) the classes 111 provided in this bundle 110. Further, the configuration unit examines any user configuration 120 that is already provided in this bundle 110. These triggers 223 together allow the configuration unit 220 to determine the bundle environment with respect to this particular bundle 110.

In more detail, the metadata 112 of the bundle 120 may include, for example, Java 5 metadata that determines dependencies of the application 100 upon specific resources within Java 5. However, any other forms of metadata 112 may also be examined. For example, in an application 100 that is instead based on a language such as C#, then annotations in C# may also be used to determine the relevant dependencies of the application 100. Also, the bundles 110 conveniently have explicitly declared dependencies. For example, OSGi bundles explicitly import packages. An Import.Package statement in an application bundle 110 will explicitly declare a dependency on a resource, such as the Hibernate library.

Scanning the classes 111 gives important clues as to the relevant bundle environment. For example, files with a ".ftl" extension will denote the dependency on the FreeMarker library resource. That is, scanning for the extension .ftl will determine whether or not this bundle needs FreeMarker. In the exemplary embodiments, the configuration unit 220 then further scans the application classes 111 to determine which files need FreeMarker and inserts the system configuration 125 for a dependency upon FreeMarker with a relevant common path for these files. This is an example of customisation wherein the system configuration 125 is tailored specifically for the components of this particular application 100.

These aspects of the exemplary embodiments will now be illustrated by the following specific example:

EXAMPLE 1

User-Supplied Component

```
package mypackage;
@Component // enables component-scanning public class Consumer {
    @Autowired // autowire the tm field
    private JtaTransactionManager tm;
    public void foo( ) {
        // do something with tm
    }
}
```

User-Supplied Manifest

Bundle-SymbolicName: mymodule
Import-Library: org.springframework.spring//dependency on spring
Import-Package: javax.transaction//dependency on JTA User-Supplied Configuration

[none—empty file]

System-Generated Configuration

```
<beans>
    <context:component-scan base-package="mypackage"/> // enable component scan and autowire
    <bean class="JtaTransactionManager"/> // user component
</beans>
```

In the above example, the import of javax.transaction causes the automatic creation of the system configuration 125 related to the JtaTransactionManager library resource 300. Also, the import of Spring and use of @Component on Consumer automatically generates the system configuration 125 for component scanning and autowiring. Many other specific implementations will be apparent to those skilled in the art based on the many hundreds of libraries and other resources that are available in practical computer systems.

Figure 5:
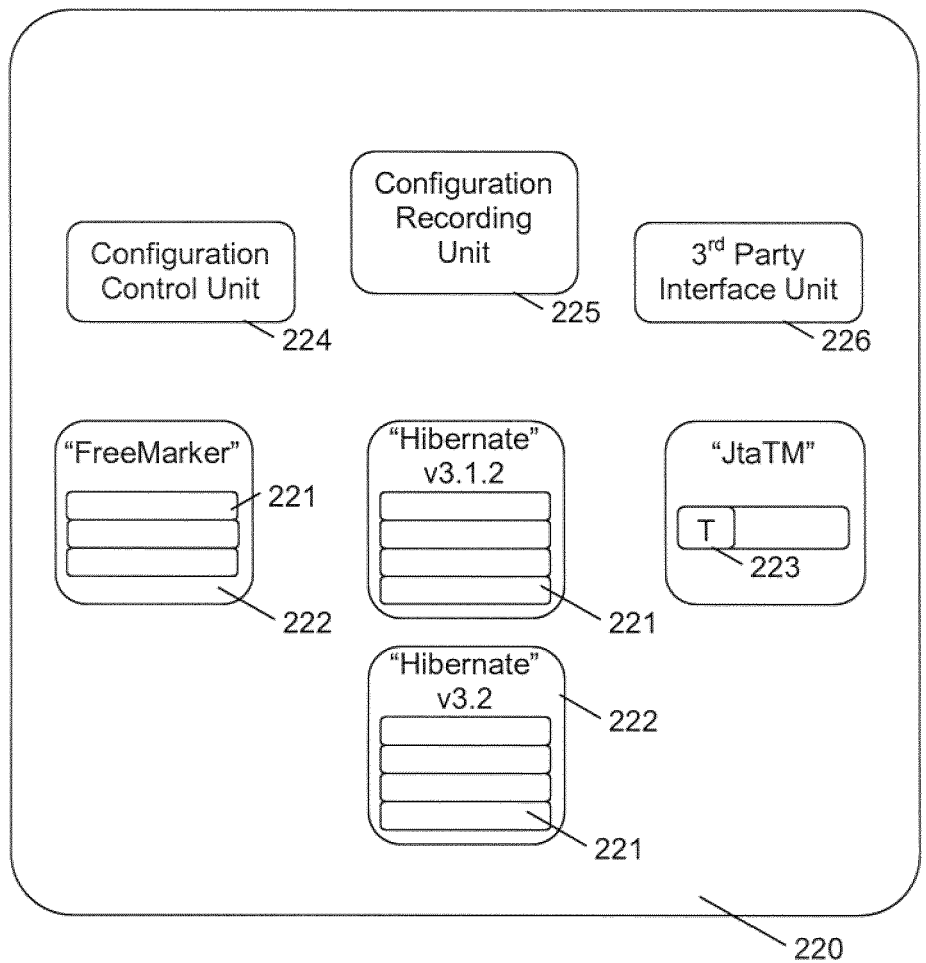
FIG. 5 is a schematic diagram showing the exemplary computer system in more detail in relation to a process of configuring an application.

FIG. 5 is a schematic diagram showing the computer system in more detail in relation to a process of configuring an application. In particular, FIG. 5 shows further aspects of the configuration unit 220 in more detail.

Firstly, the libraries 300 are often updated. Thus, many different versions of the same library may exist within the computer system 200. For example, the bundle repository 260 may contain both the library Hibernate version 3.1.2 and Hibernate version 3.2. Different applications 100 will then require different versions of the Hibernate library. In the exemplary embodiments, two different convention sets 222 are provided in the configuration unit 220, which are then associated with specific versions of this resource.

Secondly, in the exemplary embodiment, the configuration unit 220 further comprises a configuration control unit 224 and a configuration recording unit 225. Optionally, these units link to the serviceability unit 218 shown in FIG. 3.

The configuration control unit 224 is suitably arranged to selectively deactivate one or more of the convention sets 222. Conveniently, the configuration control unit 224 responds to user commands through a user interface provided by a user management console in the console unit 240 of FIG. 3. That is, a user interface allows the user to specifically exclude (deactivate) certain of the convention sets 222, so that these convention sets will not be applied to the application 100 when automatically generating the system configuration 125.

In one embodiment, the configuration control unit 224 determines a master list of available convention sets 222. Optionally, the configuration and control unit 224 further gathers a list of each of the triggers 223 associated with each of the convention sets 222. The configuration control unit 224 then presents these lists through the user interface 240. In response to user commands, the configuration control unit 224 then selectively excludes certain convention sets 222 or certain triggers 223 from the active system. This user-defined list of exclusions is a powerful mechanism for disabling the automatic activity of the computer system 200 and thus allows the user complete control over the automatic generation of system configuration 125.

The configuration recording unit 225 records the system configuration 125 that has been automatically generated. In particular, the configuration recording unit 225 records each of the convention sets 222 that have been applied to the application 100, why that convention set 222 was applied (i.e. which trigger 223) and what system configuration 125 was added to the application by the configuration unit 220 based on the one or more conventions 221 in that convention set 222. The configuration recording unit 225 suitably produces a log file to record these items. Conveniently, the log file is then available for inspection such as through a user interface provided by the management unit 240 and/or the reporting unit 250 of FIG. 3. Again, the configuration recording unit 225 provides a powerful mechanism that gives the user intimate feedback on the automatic operations of the computer system 200.

In another aspect, the configuration control unit 224 is further arranged to automatically detect collisions between the user configuration 120 and the system configuration 125, such as where both configurations attempt to configure a dependency upon the same resource 300. Here, the collision or duplication is automatically resolved by giving the user configuration 120 priority over the automatically generated system configuration 125. That is, the configuration control unit 220 may automatically exclude one or more convention sets 222 from the list of available convention sets in response to collision detection, and then re-run the automatic generation of the system configuration 125 this time without those newly excluded convention sets in order to avoid the detected collision.

In a further exemplary embodiment, the configuration unit 220 also comprises a third party interface unit 226. This third party interface unit 226 is suitably configured as an application programming interface (API) or service provider interface (SPI). The third party interface unit 226 allows third party suppliers to supply new convention sets 222 into the configuration unit 220 with appropriate conventions 221 and triggers 223. Thus, a third party supplier of a new resource 300, or a new version of an existing resource, is now able to update the computer system 200 to automatically operate in relation to this newly available resource.

Figure 6:
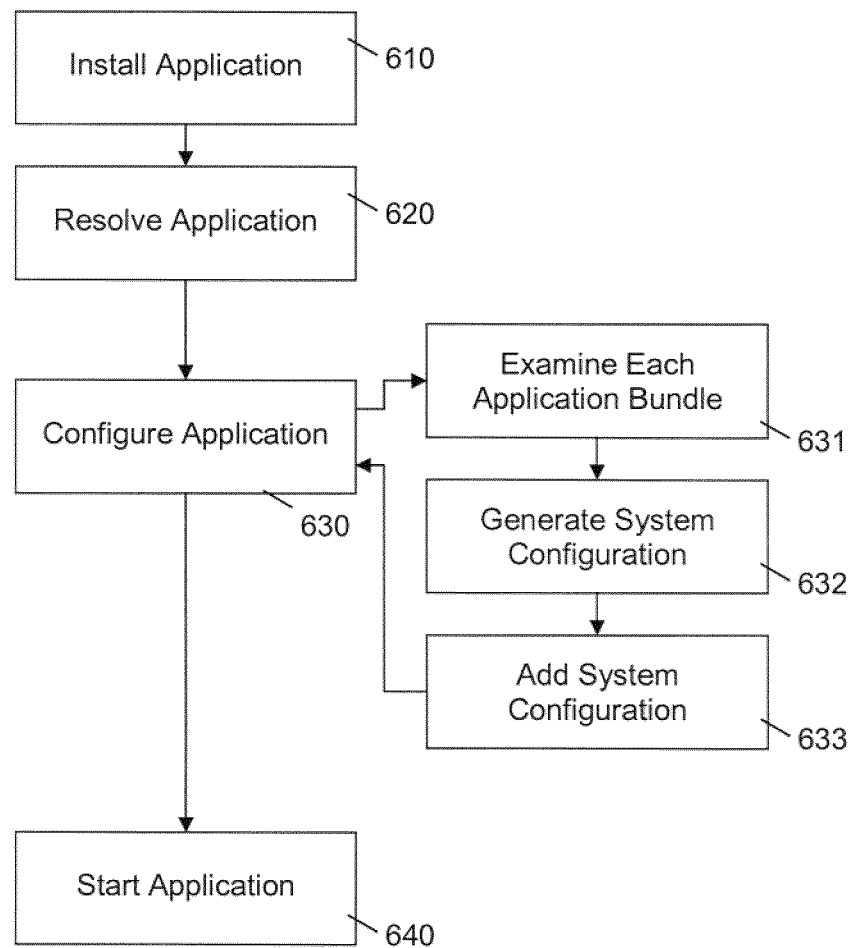
FIG. 6 is a schematic flow diagram of a method of configuring an application program in a computer system according to an exemplary embodiment of the present invention.

FIG. 6 is a schematic flow diagram of a method of configuring an application program in a computer system according to an exemplary embodiment of the present invention. In FIG. 6, the application bundles 110 are installed at step 610. The installed application bundles 110 are then resolved at that step 620. The application 100 is configured at step 630 and each of the bundles 110 are then started at step 640 including applying the configuration. Here, the step of configuring the application 100 is subdivided into the steps of examining each application bundle 110 in step 631, generating the additional system configuration 125 in step 632 as described above, and adding the system configuration 125 to the user configuration 120 in step 633. The application is then configured based on the full configuration 130, including both the user configuration 120 and the automatically generated system configuration 125, as normal in the step 630.

In summary, the exemplary embodiments have described an improved mechanism for configuring an application program within a computer system The industrial application of the exemplary embodiments will be clear from the discussion herein.

Although a few exemplary embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A computer system comprising:
one or more processors;
a configuration unit to configure the application program for deployment into a runtime execution environment, the configuration unit including a plurality of pre-determined conventions arranged into a plurality of convention sets, each convention set being associated with a respective resource of the computer system, each resource being a library, each convention providing a fragment of a configuration and being associated with one or more triggers for selecting the respective convention;
a non-transitory computer readable medium storing programming instructions operable, when executed, to cause the one or more processors to perform operations comprising:
dividing the application program into a plurality of bundles, each bundle including one or more classes of computer code and forming a portion of the application program;
examining, by the configuration unit, each of the bundles individually, including determining declared class dependency in each bundle;
determining, by the configuration unit and based on a result of the examining, that a class dependency of a first bundle of the plurality of bundles matches one or more triggers each being associated with a respective convention;
selecting, by the configuration unit, the one or more conventions associated with the one or more matching triggers; and
automatically generating a system configuration from the selected one or more conventions and configuring the application program using the system configuration, including selecting resources corresponding to each convention set that includes a selected convention, whereby dependencies of the application program upon the resources are configured based on at least the automatically generated system configuration.

2. The computer system of claim 1, wherein examining each of the bundles comprises scanning the one or more classes of the bundle.

3. The computer system of claim 2, wherein each convention is expressed as extensible markup language (XML) data.

4. The computer system of claim 1, the operations comprising adding the system configuration to a user configuration to generate a full configuration of the application program.

5. The computer system of claim 1, wherein each trigger relates to explicitly declared dependencies upon the resources.

6. The computer system of claim 1, wherein each trigger relates to inferred dependencies upon the resources according to at least one of metadata, classes, or user configuration of the bundle.

7. The computer system of claim 1, wherein examining each bundle examining user configurations associated with the bundle.

8. The computer system of claim 1, wherein the resources are provided in a plurality of resource bundles, and the resource bundles have a format compatible with the bundles of the application program.

9. The computer system of claim 1, the operations further comprising selectively deactivating certain of the conventions from use by the configuration unit.

10. The computer system of claim 9, wherein deactivating certain of the conventions is responsive to conflicts detected between a user configuration and the generated system configuration.

11. The computer system of claim 9, wherein deactivating certain of the conventions is in responsive to user commands received via a user interface.

12. The computer system of claim 1, the operations further comprising recording the selected set of one or more conventions and the corresponding system configuration for each of the bundles into a log file and reporting the log file through a user interface.

13. The computer system of claim 1, the operations further comprising receiving additional conventions in response to additional resources added to the plurality of resources.

14. A method of configuring an application program in a computer system, the method comprising:
dividing, by one or more processors, the application program into a plurality of bundles, each bundle including one or more classes of computer code and forming a portion of the application program;
examining, by a configuration unit, each of the bundles individually, including determining declared class dependency in each bundle, the configuration unit including a plurality of pre-determined conventions arranged into a plurality of convention sets, each convention set being associated with a respective resource of the computer system, each resource being a library, each convention providing a fragment of a configuration and being associated with one or more triggers for selecting the respective convention;
determining, by the configuration unit and based on a result of the examining, that a class dependency of a first bundle of the plurality of bundles matches one or more triggers each being associated with a respective convention;
selecting, by the configuration unit, the one or more conventions associated with the one or more matching triggers; and
automatically generating a system configuration from the selected one or more conventions and configuring the application program using the system configuration, including selecting resources corresponding to each convention set that includes a selected convention, whereby dependencies of the application program upon the resources are configured based on at least the automatically generated system configuration.

15. The method of claim 14, further comprising:
configuring the application program with respect to the plurality of resources according to both a user configuration and the system configuration in each of the plurality of bundles;
starting the bundles in a runtime execution environment of the computer system; and
executing the application program in the runtime execution environment of the computer system in combination with the plurality of resources.

16. A non-transitory computer readable medium having programming instructions for operable, when executed, to cause one or more processors to perform operations comprising:
dividing, by one or more processors, the application program into a plurality of bundles, each bundle including one or more classes of computer code and forming a portion of the application program;
examining, by a configuration unit, each of the bundles individually, including determining declared class dependency in each bundle, the configuration unit including a plurality of pre-determined conventions arranged into a plurality of convention sets, each convention set being associated with a respective resource of the computer system, each resource being a library, each convention providing a fragment of a configuration and being associated with one or more triggers for selecting the respective convention;
determining, by the configuration unit and based on a result of the examining, that a class dependency of a first bundle of the plurality of bundles matches one or more triggers each being associated with a respective convention;
selecting, by the configuration unit, the one or more conventions associated with the one or more matching triggers; and
automatically generating a system configuration from the selected one or more conventions and configuring the application program using the system configuration, including selecting resources corresponding to each convention set that includes a selected convention, whereby dependencies of the application program upon the resources are configured based on at least the automatically generated system configuration.

17. The non-transitory computer readable medium of claim 16, the operations further comprising:
configuring the application program with respect to the plurality of resources according to both a user configuration and the system configuration in each of the plurality of bundles;
starting the bundles in a runtime execution environment of the computer system; and
executing the application program in the runtime execution environment of the computer system in combination with the plurality of resources.

* * * * *